(12) United States Patent
Esponda et al.

(10) Patent No.: US 11,481,213 B2
(45) Date of Patent: Oct. 25, 2022

(54) SYSTEMS AND METHODS FOR PROJECT MIGRATION

(71) Applicants: Atlassian Pty Ltd., Sydney (AU); Atlassian Inc., San Francisco, CA (US)

(72) Inventors: Sebastian Esponda, Sydney (AU); Aline Guedes Pinto, Sydney (AU); Colin Chauvet, Sydney (AU); Andrew Semple, Sydney (AU); Anatolii Shuvalov, Sydney (AU); Jason Wong, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 56 days.

(21) Appl. No.: 16/920,213

(22) Filed: Jul. 2, 2020

(65) Prior Publication Data

US 2022/0004383 A1 Jan. 6, 2022

(51) Int. Cl.
| | |
|---|---|
| *G06F 9/44* | (2018.01) |
| *G06F 8/77* | (2018.01) |
| *G06F 16/21* | (2019.01) |
| *G06F 16/22* | (2019.01) |
| *G06Q 10/06* | (2012.01) |
| *G06Q 10/10* | (2012.01) |
| *H04L 9/40* | (2022.01) |
| *G06F 3/0481* | (2022.01) |
| *H04L 67/01* | (2022.01) |

(52) U.S. Cl.
CPC .............. *G06F 8/77* (2013.01); *G06F 16/214* (2019.01); *G06F 16/2272* (2019.01); *G06Q 10/06315* (2013.01); *G06Q 10/103* (2013.01); *G06F 3/0481* (2013.01); *H04L 63/0209* (2013.01); *H04L 67/01* (2022.05)

(58) Field of Classification Search
CPC ........ G06F 3/0481; G06F 8/77; G06F 16/214; G06F 16/2272; G06Q 10/06315; G06Q 10/103; H04L 63/0209; H04L 67/42; H04L 67/01
USPC .................................. 717/101–103, 168–178
See application file for complete search history.

(56) References Cited

U.S. PATENT DOCUMENTS

| | | | |
|---|---|---|---|
| 10,362,092 B1 * | 7/2019 | Parthasarathy | H04L 67/28 |
| 10,817,204 B1 * | 10/2020 | Danilov | G06F 3/0604 |
| 2018/0191582 A1 * | 7/2018 | Amendjian | H04L 41/5058 |

* cited by examiner

*Primary Examiner* — Ted T. Vo
(74) *Attorney, Agent, or Firm* — Brownstein Hyatt Farber Schreck, LLP

(57) ABSTRACT

Described herein is a computer implemented method for migrating data entities of a software service from one server instance to another server instance. A migration identifier data structure is created for migrating entities, the data structure including objects, for example in predefined name-value pairs, identifying associated entities within the software service for the migrating entities. A migration process evaluates the migration identifier data structures across migration stages to identify shared configuration between migration stages and/or missing migration entities.

20 Claims, 4 Drawing Sheets

SYSTEMS AND METHODS FOR PROJECT MIGRATION

FIELD

The present disclosure is directed to systems and methods for migrating project management functionality and data for projects.

BACKGROUND

Project management systems, including agile tools for software development, bug tracking and issue management, can substantially assist project managers/supervisors and project team members with work flow management. They can, amongst other things, assist with prioritizing tasks, allocating resources, developing a roadmap and aid in collaboration. Many current software applications are directed to a traditional client-server architecture while other software applications are directed to cloud-based architecture. Traditionally, a software application is adapted for one architecture or the other and it is difficult to migrate or transition between different architectures. The systems and techniques described herein can be used to migrate projects between different platforms and/or system architectures.

SUMMARY

Some example embodiments are directed to a computer implemented method. The computer implemented method may include providing, at a first server system, at least one source instance software service comprising maintaining, in a storage and retrieval system, a plurality of data entities and entity associations, the plurality of data entities comprising a first entity and a second entity stored associated with the first entity. The computer implemented method may also include, at the first server system and a second server system different to the first server system, a migration service. The migration service may be adapted to perform a variety of operations including, for example, determining, by the migration service, associated entities for migration entities to be migrated from the source instance software service to a target instance software service at the second server system, including determining a set of associated entities for the first entity. Based on the determined set of associated entities for the first entity, the migration service may form a data structure for the first entity, the data structure comprising an identifier of the second entity. The migration service may also evaluate the data structure for the first entity for identified associated entities, and based on the evaluation of the data structure, initiate an action comprising at least one of adding the second entity to the migration entities and generating an output identifying the second entity.

Some example embodiments are directed to a computer implemented method that includes: providing, at a first server system, at least one software service comprising a source instance project management service. The project management service may include: managing, in a storage and retrieval system, a plurality of data entities and entity associations defining a plurality of projects comprising a first project and a second project, the plurality of entities comprising a first project entity that is an entity defining the first project and not the second project and a second project entity that is an entity defining the first project and an entity defining the second project, the entity associations comprising a stored association of the first project entity and the second project entity. The project management service may also include providing, at the first server system and a second server system, a migration service for migrating the source instance project management service to a target instance project management service of a second server system. The migration service may include, for example, identifying, or receiving identifiers of entities to be migrated to the target instance project management service, comprising the first project entity; determining associations of the identified entities, including determining that the first project entity is associated with the second project entity; determining that the second project entity is a migration entity from a previous migration by the migration service and the second entity has changed since the previous migration; and based on the determination that the second entity has changed since the previous migration generating an output identifying the second entity.

Some example embodiments are directed to a non-transient computer readable memory storing instructions, which when executed by a computation system cause computational system to perform various operations. The operations may include: providing, at a first server system, at least one source instance software service comprising maintaining, in a storage and retrieval system, a plurality of data entities and entity associations, the plurality of data entities comprising a first entity and a second entity stored associated with the first entity; and providing, at the first server system and a second server system different to the first server system. The migration service may include, determining, by the migration service, associated entities for migration entities to be migrated from the source instance software service to a target instance software service at the second server system, including determining a set of associated entities for the first entity. Based on the determined set of associated entities for the first entity, the migration service may form a data structure for the first entity, the data structure comprising an identifier of the second entity. The migration service may also evaluate the data structure for the first entity for identified associated entities, and based on the evaluation of the data structure, initiate an action comprising at least one of adding the second entity to the migration entities and generating an output identifying the second entity.

Figure 1:
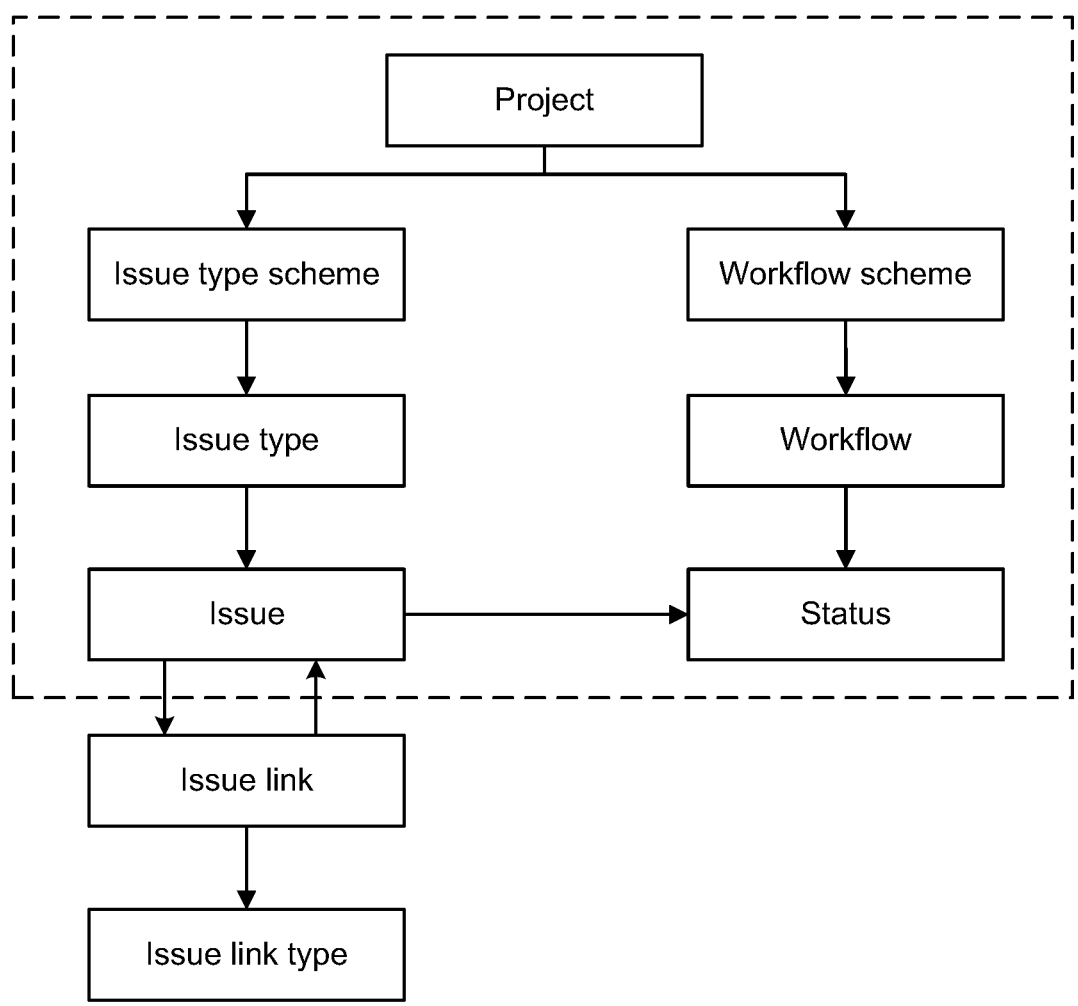
FIG. 1 is a diagrammatic representation of associations of data entities of a project management system.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

An example of a project management system for project management teams is the family of products generally called Jira Software™, available from Atlassian, Inc or Atlassian Pty Ltd. Jira Software™ and other project management software implementing a project management system may be provided as a server solution, for example Jira Server™ in which case a user may install the software on a server system controlled by them, or as software as a service ("SaaS") solution, for example Jira Cloud™ in which case a plurality of different users may each access a centralised server system that is "in the cloud" and controlled by another party.

A user of a server solution may wish to migrate to another server solution or to a cloud solution. Similarly, there may also arise a need to reorganise multiple deployments in either server or cloud, for example to consolidate into a single deployment of server or cloud solution, or federate into multiple deployments of server or cloud solutions, to meet the structural needs of the way the organization desires to manage and host its data. This presents a problem of how to create the projects and the set-up of each project's configuration in the new instance at the target site.

One option for creating projects and setting up each project's configuration in a new instance at a target site is to create these manually and then import data defining the issues for the project, for example as a Comma-Separated Values (CSV) file. Another method to migrate from a server solution to a cloud solution is to utilise a site backup or restore functionality of the server solution. By "restoring" the server solution to a new instance on the relevant cloud servers, the project team can commence using the cloud servers without any data loss. This method cannot consolidate any existing data in a cloud solution with the restored server solution, as the restoration process would overwrite anything already present in the relevant instance on the cloud servers. The method can also experience reliability issues for very large migrations and may struggle to deal with migrations where the underlying project management systems are not the same, due to the method not handling data migration at an object level, but rather a system level. One method to consolidate instances is to perform a migration onto a server solution and then "restore" the server solution to the new instance on the cloud servers. This approach has a significant cost in time and resources, is inconvenient, and also may have reliability issues for large migrations, for example due to the migration using database level transfers, rather than more resilient application programming interfaces (APIs) capable of transferring data over long time spans.

The migration options discussed above do not readily facilitate migration of a subset or selection of projects or a staged migration. However, selective or staged migration may be desired, for example to reduce the migration task into management parts, to enable a first team of users within an organisation to migrate during one time period and a second team of users within the organisation to migrate during another time period.

For the purposes of illustration and explanation, the following structure and terminology for a project management system is adopted:

A project is a collection of one or more tasks that need to be addressed by users of a project management system. An example task is to address an identified bug within software. Another example task is to add an identified feature to software, for example by developing and testing code implementing the feature. Each task of a project is associated with the project in the project management software and a project is defined at least in part by its tasks.

An issue is a definition of a task or part of a task for a project. An example of an issue is an identified bug, which directly or indirectly defines a task of addressing the bug. An issue is stored associated with a project to identify that it is an issue of the project.

An issue type is a categorisation of an issue. For example, issues relating to addressing an identified bug within software may have a type called a "bug issue type", whereas issues relating to adding a feature to software may have a different issue type, for example called a "feature issue type". An issue type is stored associated with an issue to identify the categorisation of the issue.

An issue type scheme is an association of one or more issue types with a project. For example, when a user is creating an issue for a project, the issue type scheme designates the available issue types for the project. The user may be constrained, by the issue type scheme, to choosing one of the available issue types. Two or more projects may have the same issue type scheme.

A workflow is a set of statuses and transitions between statuses that an issue moves through during its lifecycle. For example, a workflow may represent an organisational process. A status represents the state of an issue at a specific point in the workflow. A transition is a link between two statutes that enables an issue to move from one status to another.

A workflow scheme is an association of a workflow with a project or an issue type. For example, an organisational process for developing and testing a bug fix may be defined by a workflow that is associated with the bug issue type. An organisational process for developing a new feature of software may defined by a workflow associated with an issue having a feature issue type, which forms one of several features associated with a project.

An issue link is an association between issues. The issue link also has an associated issue link type. An issue link type describes or defines the association. Example issue link types include a duplicate association, in which case one issue is a duplicate of the other issue identified by the issue link and a dependent association, in which case the resolution of one issue is dependent on the resolution of another issue.

Each of the items highlighted in bold underline in the preceding paragraphs may be entities within a storage and retrieval system of the project management system. For example a particular workflow is a first entity in the system, another workflow is a second (i.e. different to the first) entity in the system and an issue type scheme is a third (i.e. different to the first and different to the second) entity. The project management system may include other entities. For example another entity type may be a comment entered by a user of the project management system in relation to an issue and stored in the project management system associated with the issue.

As will be apparent from the description above, the entities in a project management system have one or more associations with or dependencies on other entities. For example, the issue link has an association with two issues and an association with an issue link type. Each issue in turn is associated with an issue type and a status. Each issue type is associated with a project via an issue type scheme and each status us associated with a workflow, associated with a project via a workflow scheme. FIG. 1 represents a diagrammatic example of these associations. In FIG. 1 each entity is represented by a block and an arrow from a first entity to a second entity represents an association of the first entity to the second entity. For example, the project is associated with an issue type scheme and a workflow scheme and the issue link is associated with two issues (a single block representing both) and an issue link type. Project management system may include additional types of entities, may omit entity types shown in FIG. 1 and may include alternative types of entities. An issue may often have several dependent entities, including for example one or more comment entities, attachment entities, issue history entities and/or others. It will also be appreciated that a practical project management system will include many instances of each entity type. It will also be appreciated that over time the entities and their associations change.

Within project management software, two or more entities may both be associated with a single other entity. For example a single workflow may be associated with two or more workflow schemes and through associations of the workflow schemes to two or projects, the single workflow may be associated with two or more projects. Similarly, a single issue type scheme may be used for two or more projects. This sharing of entities is called configuration sharing herein.

Configuration sharing avoids duplication of entities within the project management system. Duplication of entities may increase the complexity of the system, for example requiring maintenance of two separate identifiers or names for each duplicate entity and the existence of many copies of many entities may result in a performance impact to the project management system. Further, updating of the system may become more complex, as there are more distinct entities with the same or similar function to be considered.

The inventors recognise that configuration sharing creates problems when a staged migration of all or part of a project management system is to be performed from a source instance to a target instance. An example migration is from one or more servers (the source instance) to another one or more servers (the target instance), for example due to a server upgrade from a current server to an upgraded server or a move from a local server to a cloud implementation.

A staged migration may involve, for example, migration of a subset or selection of projects. There may be configuration sharing between projects to be migrated and projects not to be migrated in the current stage. For example, a currently migrating team's projects may share a workflow with a team that is not currently migrating. The migration of the first team's projects then requires creation of two copies of the workflow, one in the source instance and one in the target instance. When the second team migrates in a subsequent stage of the staged migration, then an issue arises as to how to deal with the previously migrated workflow.

The following description is made with reference to configuration sharing in the form of workflow sharing across projects. It will be appreciated that the processes for migration may also or instead be applied to other configuration sharing.

One migration solution includes creating a one-to-one relationship between projects and workflows. For example, the migration process may involve determining the associated workflows of each project at the source instance and migrating the project and its workflows with unique identifiers. If a workflow is shared between two projects, then two entities are created in the target instance, each with a unique identifier. For example if a workflow (Workflow A) is shared between three projects (Projects, X, Y Z), then as each project is migrated the target instance includes a new copy of Workflow A. After all three projects have been migrated across one or more stages of migration, the target instance includes three workflows e.g. Workflow A, Workflow A1 and Workflow A2. This approach creates the disadvantage of potentially substantial duplication of entities and/or removes advantages of shared configuration.

Another migration solution is to create a new entity for each migration stage. For example if a workflow (Workflow A) is shared between three projects (Projects, X, Y Z), then: if Projects X and Y are migrated in a first stage, the target instance may include a copy of Workflow A, which may be a copy of the workflow that coincidentally is allocated the same name, Workflow A; and if Project Z is migrated in a later migration stage, the migration process may recognise there is already a workflow with the identifier of Workflow A in the target instance and in response create a new copy of Workflow A in the target instance with a different identifier, for example Workflow A1. The result is a reduction in duplication from the approach of creating a one-to-one relationship. There remains some duplication when there is shared configuration across stages.

In the interval between two migration stages, one or more changes may have been made to a workflow within one instance and not the other. This may be referred to as "configuration drift". With reference to either example of a first stage migration of Projects X and Y an a later stage migration of Project Z described in the preceding paragraphs, if Workflow A was updated at the source instance between the first migration stage and the later migration stage, then that update may be lost in the target instance in relation to Projects X and Y. This can result in the project management system implementing a suboptimal solution for some projects and/or tending to create inconsistency in organisational practice.

When configuration drift is detected, it may be addressed to improve the migration process. One method for addressing detected configuration drift is to provide a message, prompt or other indicator to a user. The indicator may contain information that identifies (or is usable to identify) the entity or entities involved in the configuration drift. The migration process may be halted or prevented pending resolution of the configuration drift. Alternatively the migration process may proceed, with the indicators being usable by a user to take action post-migration and/or approve the transformation of data to confirm with the configuration environment in the target.

In some embodiments configuration drift is addressed manually by a user. The actions of the user may be informed by the indicator provided. In other embodiments, the migration process may proceed by a process that includes automatically or semi-automatically (e.g. by first asking for user input beforehand) create two entities in the target instance for the relevant workflow (one corresponding to the source instance workflow as at the first migration and one corresponding to the source instance workflow at the second migration) or may automatically or semi-automatically select one of the source instance workflows for the target instance. In some embodiments, the two options are presented to a user, and the system receives a selection of one and then proceeds with the migration in accordance with the selection.

As indicated above, the user may take action in response to the indicator. The action may include accepting the configuration drift, or modifying one or more of the configuration drift workflows. If the configuration drift is accepted, then two workflows will be created in the target instance, increasing the number of entities in the target instance. One option for modification of configuration drift entities is to select one version of the workflow for use across all migrated entities that shared the workflow in the source instance. In that case creation of duplicate workflows is avoided. Another option for modification is to create a new version of the workflow for the target instance. The new version may for instance be adapted to the project(s) or relevant issue type(s) of the project(s) with which it is associated.

Figure 2:
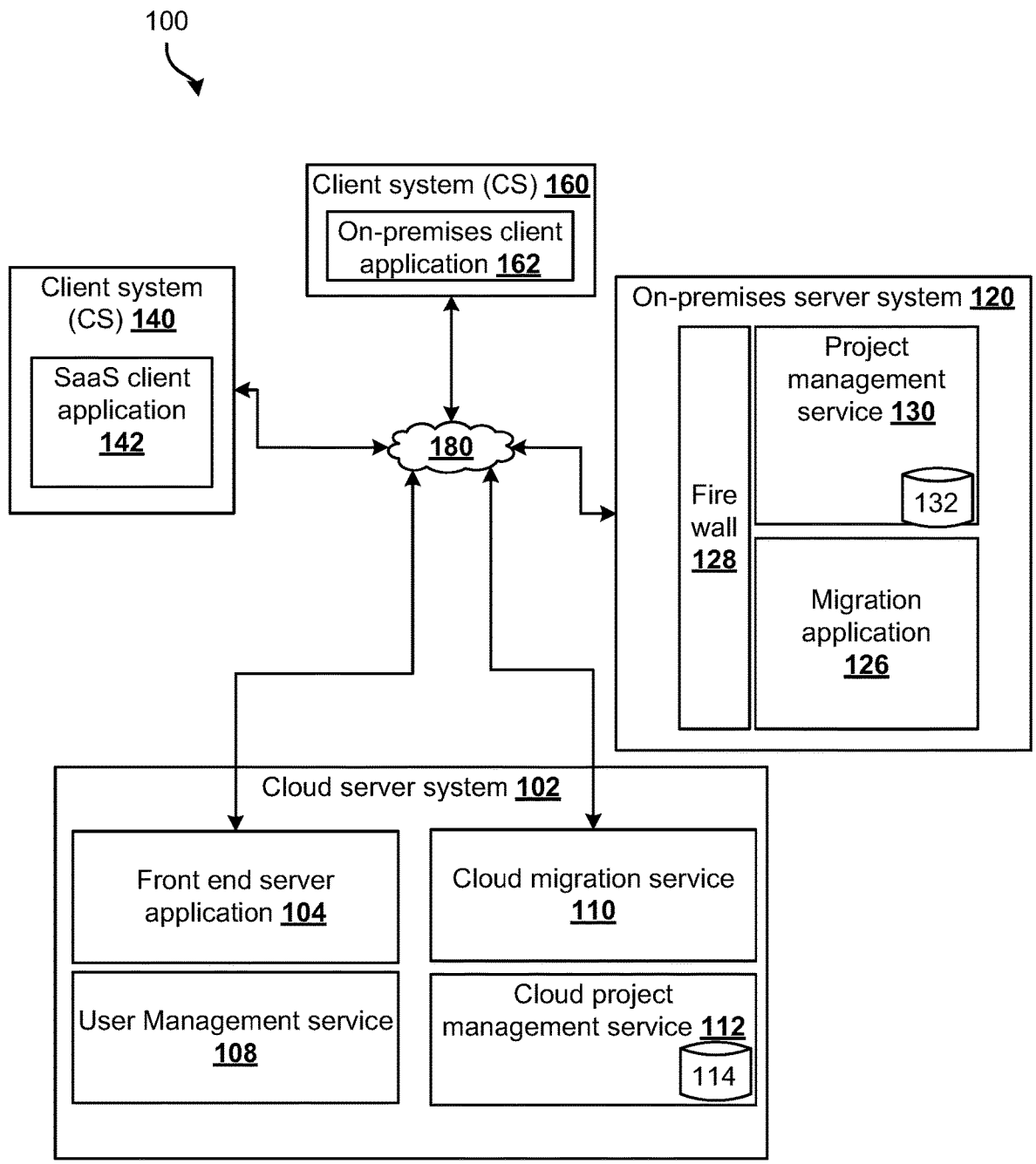
FIG. 2 is a block diagram representation of a networked environment in which network components have been configured to provide, for a project management service, a migration service from an on premises server solution to a cloud solution.

The systems associated with the source instance and the target instance require a functionality to provide the indication of configuration drift and/or provide the functionality to address configuration drift. FIG. 2 shows a system diagram with an example configuration for providing this functionality.

FIG. 2 depicts one example of a networked environment 100 in which network components have been configured to perform operations and techniques of embodiments described herein. The example is with reference to a migration from an on-premises server system 120 to a cloud server system 102. Migrations between other entities (e.g. on-premises server system to on-premises server system, cloud server system to on-premises server system or cloud server system to cloud server system) will involve similar processes. Each of the on-premises server system 120 and cloud server system 102 may include various processing devices, communication paths (including one or more networks) and other computational components.

The networked environment 100 includes one or more client systems, two client systems 140 and 160 being shown in FIG. 2. These systems are interconnected, for example via a network, which may be a public/untrusted communications network 180 (e.g. the Internet).

The on premises server system 120 provides, or provides access to, a project management service 130. The project management service 130 may be located behind a firewall 128 implemented by the on-premises system 120. The project management service 130 has an associated entity repository 132 implemented within suitable data storage. The entity repository 132 may store entities described with reference to FIG. 1. The project management service 130 includes an integrated user management service. In other embodiments, the user management service is provided by a separate software module or application.

The cloud server system provides a cloud project management service 112. The cloud project management service 112 has an associated entity repository 114 implemented within suitable data storage. Like the entity repository 132, the entity repository 114 may store entities described with reference to FIG. 1.

The on-premises server system 120 also implements a migration application 126. The migration application 126 may also be behind the firewall 128. The migration application 126 is configured to operatively communicate with both the project management service 130, in particular to directly or indirectly access the entity repository 132, and with a corresponding cloud migration service 110 of the cloud server system 102. The migration application 126 and migration service 110 provide a migration service and communicate according to an application programming interface (API) over a communication pipe. Similarly the APIs of the migration application 126 and migration service 110 provides for communication with the client systems 140, 160. The communication pipes include appropriate security by, for example, data encryption and/or creating a virtual private network between them.

Whilst the migration application 126 and cloud migration service 110 are represented by separate blocks in FIG. 1 to their respective project management service, in various embodiments some or all of their functionality may be combined. The functions of the migration service 110 may be incorporated into the migration application 126 or the functions of the migration application may be incorporated into the migration application 126. Additionally, the blocks represent functional aspects of the on-premises server system 120 and cloud server system 102. These may be implemented by separate applications or separate modules to the project management service, or may be an integrated function of the software implementing the project management service.

The cloud server system 102 implements a front end server application 104. The front end server application 104 may serve requests, for example from a client system 140 running a SaaS client application 142, for remote access to a service of the cloud server system 102, in particular the cloud project management service 112. The front end server application 104 may facilitate multiple different users accessing multiple different projects. The association of users with projects may be managed by a user management service 108. For example, the user management service 108 may store users, groups of users and organisations and associate one or more of the users, groups of users and organisations with one or more projects (each project having one or more entities, as described with reference to FIG. 1). The user management service 108 may also store the rights and permissions of users, groups of users and organisations in relation to projects management by the cloud project management service 112 and the entities associated with or associable with the projects. The user management service 108 may be a separate service to the cloud project management service 112, either on the cloud server system 102 or in a different server system in communication with the cloud server system 102 (e.g. an external identity provider service) or integrated with the cloud project management service 112.

The cloud server system 102 will typically include additional components to those illustrated and described. As one example, cloud server system 102 will typically include one or more firewalls and/or other network security components and load balancers.

While the SaaS client application 142 and on-premises client application 162 have been described as being on two separate systems, they may—and will often—be installed on a single client system. Additionally, a single application (e.g. a web browser or other application) may be installed to provide the functionality of both the SaaS client application 142 and on-premises client application 162.

A project migration service, provided in part by the migration application 126 and in part by the cloud migration service 110, allows users to migrate projects from a source instance (the project management service 130 in the example) selectively step-by-step, to a target instance (the cloud project management service 112 in the example) without affecting other projects on the target instance. Each entity (e.g. see FIG. 1) may be processed individually by the project migration service. The individual processing of entities allows for an implementation in which migration failure of an individual entity does not cause failure of the entire migration. For example, instead the failure may be limited to that entity and the entities that are dependent on it.

For a migration of entities from a source instance to a target instance, the migration service receives identities of the entities for migration or identifies the entities for migration. The entities associated with the migration may be associated with the migration in various manners, including for example one or more of: being part of an entire project management service that is to be migrated; directly or indirectly linked by entity dependencies with a project of a project management service that is to be migrated; and being associated with a user or group or organisation of a project management service that is to be migrated, for example via an association of the user or group with a project, which in turn is directly or indirectly linked by entity dependencies to the entities for migration. The migration service may include an API with the project management service to identify one or more project management services, projects, users and/or groups for migration. For example, these may be listed in a user interface for display to a user together with an icon, button or other selector for the user to indicate which service(s), project(s), user(s) and/or group(s) are to be migrated. Alternatively or additionally, the user interface may provide a function to select individual entities for migration.

For example, the entities initially identified for migration may be entities within one or more selected projects down to the issues for that project. The selected projects may be directly or indirectly selected by a user, as described above. Referring again to FIG. 1, the entities within a project may encompass the entities within the dashed box. In this simplified example of entity types that may exist, the entities marked for migration for a project are the issues for that project. The issues exclude those that have a dependency relationship with the issues of the project being migrated. For example, if an issue link points to an issue of another project, this issue is not migrated.

The migration service evaluates the project management service 130 and allocates each entity of the project management service 130 in entity repository 132 to be migrated with a migration identifier (MID). The entities not being migrated are not allocated a MID. The MID for each entity is a data structure of a collection of data objects stored in suitable data storage, for example the same data storage that provides the entity repository 132 and/or the data storage that provides the entity repository 114. The MID is unique, at least within a scope of a migration.

The MID is structured to include one or more references to other entities. The MIDs and references use a predefined notation, called herein a migration resource identifier (MRI). The MRIs allow MIDs to be represented in a form that can be mapped in a generic way, without having any product specific knowledge. The ability to trace and link entities via the MIDs is based on storing the entity relationships using arbitrary MID numbers, without storing what the data relationships are between entities. For example, a project may be mapped to any of the entities in a project management service. The project management service may interact with a third party application, which maps the project to one or more entities of the third party application. The MIDs allow the migration service to accommodate the additional mapping without knowledge of the relationships created by the third party application.

The MID includes an identifier of the entity to which it is allocated. The identifier of the allocated entity is in the form of an MRI. The MRI indicates the type of entity that it refers to. The MID also includes one or more predefined data items, dependent on entity type referred to in the identifier of the entity. One or more of these predefined data items include an identifier of an entity associated with the allocated entity. The identity of an associated entity is also in the form of an MRI. The MID is therefore in the form of a tree structure. It may, for example, be implemented using JavaScript Object Notation (JSON).

For example MRI notation may be in the form:
mri: [type]:[namespace]:[entityType]:[entityId].
Within this notation, "mri" indicates that data structure is a MRI and each item in square brackets is a data item or array characterising the MRI. In this example, the data items include:

type—MRI type, can be either mig—migration e.g. ID of an entity that was migrated and, therefore, needs to be mapped; or res—resulting e.g. reference to an entity that already exists in the target site. As the allocated entity is not required for mapping, it need not be updated based on its migration status. The associated entities are updated.

namespace—a group of entities within the same product. The product is a reference to a particular project management service, for example the project management service 130.

entityType—type of entity within a given namespace. Example types of entities are described with reference to FIG. 1, including for example a workflow, a workflow scheme, an issue and so forth.

entityId—local entity identifier. This identifier uniquely identifies the entity at least within its given type within a given namespace. For example each individual workflow within a project will have a unique local entity identifier. The entityId may be an identifier used by the product (i.e. the project management service), determined by the migration service based on an identifier or other attribute of the entity used by the product, or a new identifier generated by the migration service without reference to an identifier used by the product. A user of the migration service may therefore use the MRI to identify the entity. In some embodiments, a user interface of the migration service includes a selectable element, for example a selectable icon associated with a displayed MRI, selection of which causes the migration service to cause the entity for the MRI to be displayed.

The migration service keeps track of entities and their migration resulting MRI pairs to resolve dependencies. The MRI allows a generic dependency resolution logic to find and replace all MIDs without having any specific knowledge about the object type.

An example of a project management service, available both as an on-premises server solution and as a cloud solution on the filing date of the present application is Jira™ from Atlassian, Inc or Atlassian Pty Ltd. Entity types of Jira™ include issues and issue links. An example MID for an issue link entity in Jira™ is:

```
{
    "_id": "mri:mig:jira:issueLink:10011",
    "type": "mri:mig:jira:issueLinkType:10004",
    "sourceIssue": "mri:mig:jira:issue:10006",
    "destinationIssue":"mri:mig:jira:issue:10013",
    "created": "2020-03-09T00:25:19.740Z",
    "updated": "2020-03-10T00:25:19.740Z"
}
```

The data objects_id, type, sourceIssue, destinationIssue, created and updated are data values in name-value pairs. The names of the data objects_id, type, sourceIssue, and destinationIssue are MRIs of other entities of the project management service. These other entities are those that have a dependency relationship between the entity of the MID (the issue link in this example) and that entity. In this example, an issue link entity has dependencies with an issue type entity and two issue entities. If the issue type entity indicates a dependency, the two entities may be a first issue (sourceIssue) and a second issue (destinationIssue) that must be resolved before the first issue can be resolved.

The names of the data objects created and updated are attributes of the issue link identified by the entityID 10011. The created and updated data objects refer to the date of creation of the entity in the source instance and the date of the most recent update of the entity, if any, in the source instance.

The data objects or the populated data objects (e.g. the values with names that are not null) of different types of entity within a given namespace are set or determined based on the entity type and differ between entity types. For example a workflow entity will not have a data object with a value issuelinkType as there is no direct dependency between a workflow entity and an issue link type entity. A workflow instead may include data objects with names populated with MRIs of one or more workflow schemes, one or more statuses and one or more issues.

The migration service scans the MIDs of entities identified for migration (e.g. marked for migration or already migrated) and determines the data objects that look like MRIs. Action is then taken based on the MRI's determined from the scan of the MIDs. The action taken may vary across different embodiments and/or vary depending on a user selectable configuration of the migration service.

In some embodiments, the migration service automatically assists with the migration of entities, based on the MRI's determined from the scan of the MIDs. The entities identified by the MRIs determined in the scan of MIDs are migrated, caused to be migrated or marked for inclusion in the migration. This process may include allocating the entities identified by the MRIs with MIDs. The migration service may then scan the MIDs of the identified entities, to determine further entities for migration. This recursive process continues until no new MIDs are identified by the MRIs within the entities for migration. The migration service then migrates all entities it has determined either without further user input or presents the proposed entities to be migrated and presents a user interface for a user to approve, either globally or individually, the entities proposed for migration.

In other embodiments, the migration service automatically generates data for assistance with the migration. When performing the scan of MIDs, a report is generated, identifying entities or MRI's of entities that have not been migrated (or are not marked for migration) that have a dependency relationship with the migrated entities. In some embodiments the migration service both automatically assists with the migration of entities and generates data for assistance with the migration. The data may, for example, provide a record of what entities have been automatically added to the migration.

The MIDs of entities for the migration are resolved. Continuing with the example of an issue link in Jira™, in an instance that all entities with a dependency with the issue link are migrated or indicated for migration, the MID may be resolved to:

```
{
    "_id": "mri:mig:jira:issueLink:10011",
    "type": "mri:res:jira:issueLinkType:39201",
    "sourceIssue": "mri:res:jira:issue:49344",
    "destinationIssue":"mri:res:jira:issue:93904",
    "created": "2020-03-09T00:25:19.740Z",
    "updated": "2020-03-10T00:25:19.740Z"
}
```

In an instance that not all entities with a dependency with the issue link are migrated, one or more of the MRI's are not changed from the mig type to the res type. The migration service can then generate data or a report based on the MIDs, in particular by scanning for remaining mig type MRIs within the MIDs for migration. As described above, the data may be provided to a process by the migration service to add entities to the migration and/or to a process by the migration assistant to provide a report that identifies issues, including missing dependencies. In some embodiments the migration service then resolves the entities added or reported to the res type.

The scanning process may include a predetermined execution order. The execution order may be based on entity type. The order may be based on the number of dependencies that the type of entity has. The order may start with entities with the lowest number of dependencies and progress to entities with higher number of dependencies. The order may be a linearized execution order. For example, first all entities that are of the entity Type "issue type" may be scanned and the MRIs within it identified and resolved. Next may be the entities of entityType "status", followed by "workflow", "workflow scheme" . . . "Project" and "Issue". Within an entity type the migration may be batched or the order may be selected according to any suitable method, for example based on creation date, update date or by random or quasi-random selection.

When scanning the MIDs the migration service may also determine whether any entity in a current migration has been migrated to the target instance in a previous migration. This determination may be based, for example, on the entity already having an allocated MID. In some embodiments the migration service may also use the date of creation for determining whether the MID has been created as part of the current migration or from a previous migration. If the entity has been previously migrated, the migration service determines whether the entity has changed since it was migrated. In some embodiments, the date of the most recent update of the entity in the source instance (as specified in the MID) can indicate whether it has changed. In other embodiments, content of the entity itself is used to determine if there has been a change, for example by computing a hash of the entity and including that in the MID when it is created. A new hash is then computed when in a subsequent migration another entity associated with that entity is to be migrated.

If the entity in the source instance has been updated since the last migration (e.g. includes a later date for the most recent update), then in response the migration service takes action. Different actions are performed in different embodiments or in accordance with a user selectable configuration.

In some embodiments the migration service provides a message, prompt or other indicator to a user. The indicator contains information that identifies (or is usable to identify) the entity or entities involved in the configuration drift. The migration process may be halted or prevented pending resolution of the configuration drift. Alternatively the migration process may proceed, with the indicators being usable by a user to take action post-migration.

An example data structure that is populated by the migration service for forming the indicator is an error table, stored in an error database. The error database may be in the storage of the entity repository 132, in the storage of the entity repository 114 or in another data store. The database may for example be a NoSQL database. The error table includes an identifier of the entity involved and an indication of at least any failed results. The identifier may be the MRI of the entity involved. The indication of a failed result may be a binary indicator of either failed or not. In other embodiments further information is included in the error table. This further information may include more specificity as to the reason for the failure. For example, different error messages may be recorded in the table dependent on whether the entity itself failed to migrate or whether the entity itself was migrated but an entity that it has a dependency relationship with was not migrated or failed to migrate. Different error messages may be recorded dependent on the type of failure, for example a failure to successfully create a corresponding entity in the target instance, or an identification that a corresponding entity already exists in the target instance but there has been configuration drift. In the instance that a dependency relationship entity was the cause of the failure, then the table may be populated with an identifier (e.g. MRI) of the dependency relationship entity.

Table 1 is an example portion of an error table for a migration involving an "issue" entity with a dependent "issueSecurityLevel" entity and a dependent "comment" entity.

to configuration drift. A comment entity also had a dependency relationship with the issueSecurityLevel entity as therefore also shows a "Failed_dependency". The fourth (FailureOriginId) column identifies the entity with the dependent relationship that caused the "Failed_dependency" result.

The migration service may include an error service to interrogate the error table and present the errors to a user. The error database may include a human readable string associated with each error result, explaining the reason for the error and/or an action that may help resolve the error. Alternatively the error service may map a human readable message to the error types in the error table. Where the error table includes only a generic failure indicator (e.g. failure to migrate due to configuration drift or failure to migrate for another reason is not specified), the human readable message may include possible reasons for the failure, how to check for them and/or suggested actions.

In some embodiments the errors are presented to the user as a downloadable error report. In some embodiments one or more categories of errors are associated with and may trigger or provide access to a user interface for resolving the error, in an automated or semi-automated manner.

In some embodiments, in the case of configuration drift, the error service may identify to the user the two versions of the entity, the one in the source instance and the one in the target instance. The user may be presented with one or more options for action by the error service, which may then update the target instance in accordance with a selected

TABLE 1

| MigrationScopeID (Hash Key) | EntityIdentifier | Result |
|---|---|---|
| 1cf2fofb . . . (UUID) | mri:mig:jira:issue:10001 | mri:res:jira:issue:10001 |
| 1cf2fofb . . . | mri:mig:jira:issueSecurityLevel:10001 | Failed_configuration |
| 1cf2fofb . . . | mri:mig:jira:issue:10001 | Failed_dependency |
| 1cf2fofb . . . | mri:mig:jira:comment:10001 | Failed_dependency |

In embodiments in which the entity that causes a Failed_dependency error is identified, an additional attribute may be included in the table, for example as a further column to Table 1. An example additional (fourth) column is shown in Table 2.

TABLE 2

| FailureOriginId |
|---|
| <null> |
| <null> |
| mri:mig:jira:issueSecurityLevel:10001 |
| mri:mig:jira:issueSecurityLevel:10001 |

In this example error table, the first column identifies the migration performed by the migration service. In this embodiment the migration is uniquely identified by a UUID. The second column is the MRI of the entity migrated or sought to be migrated. The MRI of the issue entity appears twice, once to indicate that the entity itself was successfully migrated, as indicated by the MRI in the third (Result) column, and once to indicate that an entity with a dependency relationship with the issue entity has not been migrated, as indicated by the "Failed_dependency" in the Result column. The failed dependency in this example is due to the issueSecurityLevel entity currently existing in the source instance not being migrated to the target instance due option. As mentioned above these options may include a) creating two entities in the target instance (one corresponding to the source instance entity as at the earlier migration and one corresponding to the source instance entity as at the current migration), b) using the source instance entity as at the current migration, in which case the migration service replaces the corresponding entity in the target instance, or c) using the source instance entity as at the previous migration, in which case the migration service maps the entities with a dependent relationship to the existing entity in the target instance. The options may also include an option not to take action at this time or to provide a user interface for manual action.

Figure 3:
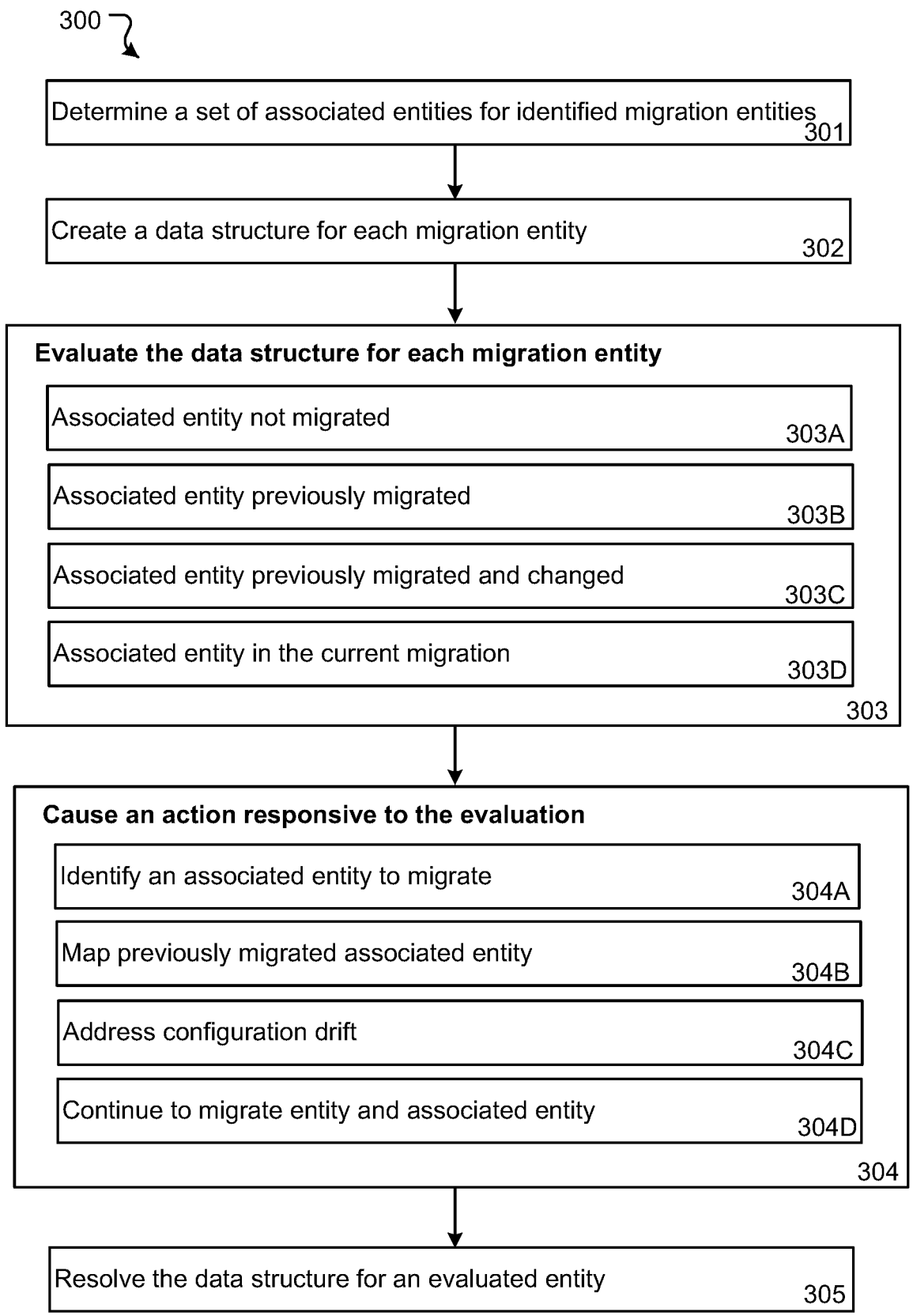
FIG. 3 is a diagram of a method performed by a migration service. The migration service may be a migration service as described with reference to FIG. 2 or another migration service.

FIG. 3 shows a diagram of operations 300 performed by a migration service, for example a migration service described with reference to FIG. 2.

The migration service is provided for a server system implementing a source instance of a software service, for example a project management service as described. The executables of the migration service may be local or remote to the server system (e.g. at a server system implementing a target instance of the software service or at a third server system for managing the migration).

At step 301 the migration service determines a set of associated entities for identified migration entities to be migrated from the source instance software service to the target instance software service. This determination may be through an API with the project management service or by otherwise interrogating a data store of entities of the project management service.

At step 302, the migration service creates a data structure for each migration entity that includes data objects identifying the migration entity and each of its associated entities. It will be appreciated that some associated entities may also be an identified migration entity for the current migration.

At step 303, the data structure for each migration entity is evaluated. The evaluation includes determining whether associations create issues with the project migration. Example determinations include one or more of (in any combination) step 303A determining that an associated entity is not in the current migration and not previously migrated, step 303B determining that an associated entity has been previously migrated and has not changed since the migration, step 303C determining that an associated entity has been previously migrated and has changed since the migration, and step 303D determining that an associated entity is in the current migration and not previously migrated.

At step 304, an action is taken responsive to the evaluation of the migration entities. Example actions include step 304A of causing a process for adding an associated entity to the current migration, step 304B of causing the current migration to include within its mapping of associations the previously migrated associated entity, step 304C of causing a process for dealing with the change in entity and step 304D of continuing the migration without any of the preceding actions. It will be appreciated that these actions 304A to 304D correspond to the determinations of 303A to 303D and may be caused responsive to their respective determination.

At step 305 the data structure for each evaluated migration entity is resolved. Step 305 may include updating the associations within a data structure to indicate that the associated entity is migrated. Referring again to the preceding example, the MRI type may be changed from mig to res or retained as mig. It will be appreciated that the process to complete step 305 may overlap with the process of step 304, reflecting a recursive evaluation and resolution process for the entities.

Figure 4:
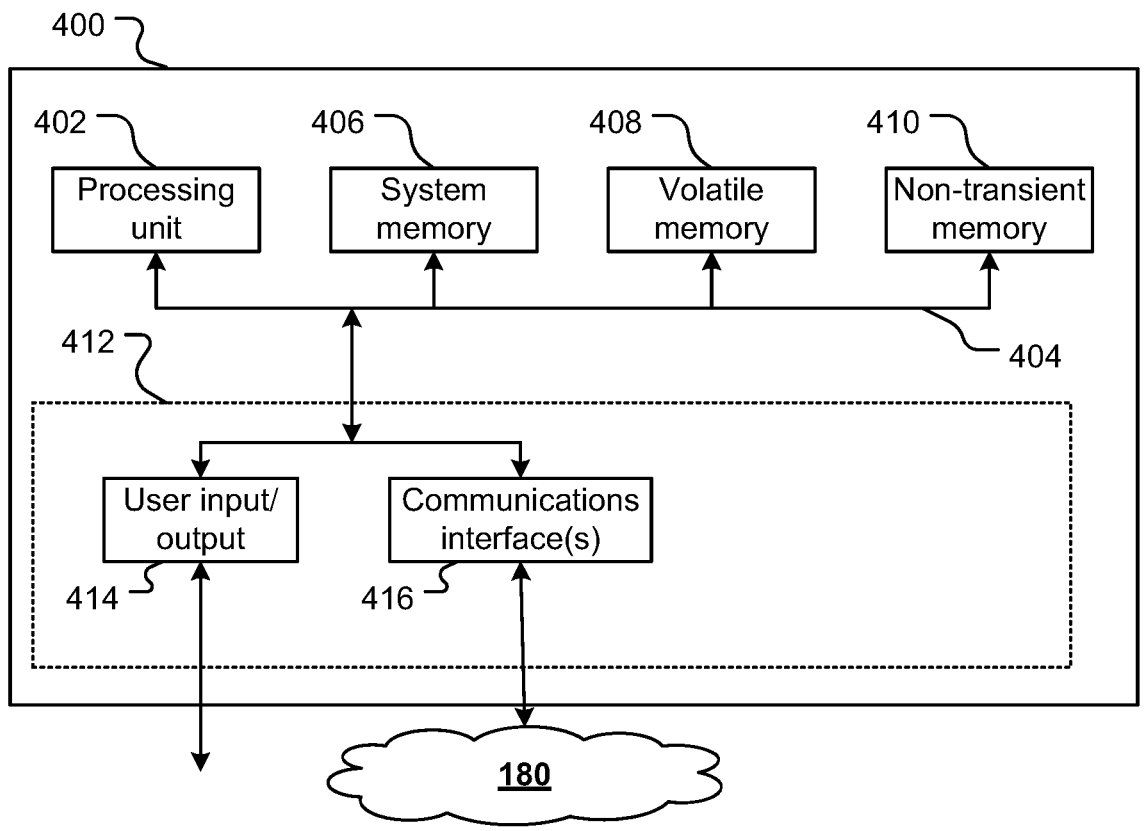
FIG. 4 is a block diagram of a computer processing system configurable to perform various features of the present disclosure, for example configured to perform processes of FIG. 3.

FIG. 4 provides a block diagram of a computer processing system 400 configurable to implement embodiments and/or features described herein. System 400 is a general purpose computer processing system. It will be appreciated that FIG. 4 does not illustrate all functional or physical components of a computer processing system. For example, no power supply or power supply interface has been depicted, however system 400 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 400 includes at least one processing unit 402. The processing unit 402 may be a single computer processing device (e.g. a central processing unit, graphics processing unit, or other computational device), or may include a plurality of computer processing devices. In some instances, where a computer processing system 400 is described as performing an operation or function all processing required to perform that operation or function will be performed by processing unit 402. In other instances, processing required to perform that operation or function is also performed by remote processing devices accessible to and useable by (either in a shared or dedicated manner) system 400.

Through a communications bus 404 the processing unit 402 is in data communication with one or more machine readable storage (memory) devices which store instructions and/or data for controlling operation of the processing system 400. In this example system 400 includes a system memory 406 (e.g. a BIOS), volatile memory 408 (e.g. random access memory such as one or more DRAM modules), and non-volatile memory 410 (e.g. one or more hard disk or solid state drives).

System 400 also includes one or more interfaces, indicated generally by 412, via which system 400 interfaces with various devices and/or networks. The interfaces may include user input and user output devices 414 and one or more other communication interfaces 416. Generally speaking, other devices may be integral with system 400, or may be separate. Where a device is separate from system 400, connection between the device and system 400 may be via wired or wireless hardware and communication protocols, and may be a direct or an indirect (e.g. networked) connection.

Depending on the particular system in question, devices to which system 400 connects—whether by wired or wireless means—include one or more input devices to allow data to be input into/received by system 400 for processing by the processing unit 402, and one or more output devices to allow data to be output by system 400. Example devices are described below, however it will be appreciated that not all computer processing systems will include all mentioned devices, and that additional and alternative devices to those mentioned may well be used.

For example, system 400 may include or connect to one or more input devices by which information/data is input into (received by) system 400. Such input devices may include keyboards, mice, trackpads and the like. System 400 may also include or connect to one or more output devices controlled by system 400 to output information. Such output devices may include devices such as displays, touch screen displays, speakers, LEDs/other lights, and such like. The input and/or output devices may be another computer processing system. System 400 may also include or connect to devices which may act as both input and output devices, for example memory devices (hard drives, solid state drives, disk drives, compact flash cards, SD cards and the like) which system 400 can read data from and/or write data to, and touch screen displays which can both display (output) data and receive touch signals (input).

The communications interfaces 416 include devices for communication with a network, such as the network 180 of FIG. 2. Via the communications interface(s) 416, the system 400 can communicate data to and receive data from networked devices, which may themselves be other computer processing systems.

System 400 stores or has access to computer applications (also referred to as software or programs)—i.e. computer readable instructions and data which, when executed by the processing unit 402, configure system 400 to receive, process, and output data. Instructions and data can be stored on non-transient machine readable medium accessible to system 400. For example, instructions and data may be stored on non-transient memory 410. The instructions for the migration service may be in non-volatile memory 410. Instructions and data may be transmitted to/received by system 400 via a data signal in a transmission channel enabled (for example) by a wired or wireless network connection over interface such as 412.

In some cases part or all of a given computer-implemented method will be performed by system 400 itself, while in other cases processing may be performed by other devices in data communication with system 400. The system 400 may be one or more servers providing a source instance project management service as described herein, one or more servers providing a target instance project management service as described herein and/or a system providing a migration service or a part thereof as described herein, separate from the systems providing the project management service.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless otherwise stated, the terms "first", "second", "third" and so forth are used to indicate individual instances of the object or process referred to and are not used to indicate any required ordering, in time or otherwise.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method, comprising:
providing, at a first server system, at least one source instance software service comprising maintaining, in a storage and retrieval system, a plurality of data entities and entity associations, the plurality of data entities comprising:
a first entity; and
a second entity associated with the first entity; and
providing, at the first server system and a second server system different to the first server system, a migration service; and
at the migration service:
determining a set of entities associated with the first entity, including determining that the second entity is associated with the first entity, wherein the first entity is a migration entity of a set of migration entities to be migrated from the source instance software service to a target instance software service at the second server system;
in accordance with a determination that the second entity has not been previously migrated from the source instance software service to the target instance software service, adding the second entity to the set of migration entities; and
in accordance with a determination that the second entity has been previously migrated from the source instance software service to the target instance software service:
determining whether the second entity is different from a previously migrated version of the second entity at the target instance software service; and
in accordance with a determination that the second entity is different from the previously migrated version of the second entity, causing an error message identifying the second entity to be displayed to a user.

2. The method of claim 1, wherein:
the method further comprises, based on the determined set of associated entities for the first entity, forming a data structure for the first entity, the data structure comprising an identifier of the second entity and a third entity; and
the method further includes determining that the third entity is one of the migration entities of the set of migration entities.

3. The method of claim 2, further comprising:
resolving the data structure to record in the data structure that the third entity is one of the migration entities of the set of migration entities.

4. The method of claim 2, further comprising:
resolving the data structure to record in the data structure that the second entity is one of the migration entities of the set of migration entities.

5. The method of claim 2, further comprising:
forming a data structure for a fourth entity, based on a determined set of associated entities for the fourth entity;
determining that the fourth entity is of a first type and that the first entity is of a second type; and
based on the determination, evaluating the data structure for the fourth entity for identified associated entities before evaluating the data structure for the first entity.

6. The method of claim 2, wherein:
the data structure for the first entity is a first migration identifier;
determining that the second entity has been previously migrated comprises determining that the second entity has a second migration identifier;
the second migration identifier comprises a date of modification; and
the determination that the second entity has changed since the previous migration is based on the date of modification of its migration identifier.

7. The method of claim 1, wherein the error message identifying the second entity also comprises an identifier of the previously migrated version of the second entity.

8. The method of claim 7, further comprising presenting a user interface to a user, the user interface configured to allow the user to view content of both the second entity and the previously migrated version of the second entity.

9. The method of claim 8, wherein the user interface comprises an option to select the second entity and the method includes, responsive to the selection, the migration service replacing the previously migrated version of the second entity in the target instance software service with the second entity.

10. The method of claim 1, wherein the method further comprises:
based on the determined set of associated entities for the first entity, forming a data structure for the first entity, the data structure comprising an identifier of the second entity and a third entity;
determining that the third entity has been previously migrated such that the target instance software service has a target third entity as a result of the previous migration; and responsive to the determination, the migration service creates a target first entity in the target instance software service and associates the target first entity with the target third entity.

11. The computer implemented method of claim 1, further comprising migrating the second entity to the target instance software service.

12. A non-transitory computer-readable storage medium storing instructions, which when executed by one or more processors of a computing system, cause the computing system to perform operations comprising:
providing, at a first server system, at least one source instance software service comprising maintaining, in a storage and retrieval system, a plurality of data entities and entity associations, the plurality of data entities comprising:
a first entity; and
a second entity associated with the first entity; and
providing, at the first server system and a second server system different to the first server system, a migration service configured to:
determine a set of entities associated with the first entity, including determining that the second entity is associated with the first entity, wherein the first entity is a migration entity of a set of migration entities to be migrated from the source instance software service to a target instance software service at the second server system;
in accordance with a determination that the second entity has not been previously migrated from the source instance software service to the target instance software service, adding the second entity to the set of migration entities; and
in accordance with a determination that the second entity has been previously migrated from the source instance software service to the target instance software service:
determining whether the second entity is different from a previously migrated version of the second entity at the target instance software service; and
in accordance with a determination that the second entity is different from the previously migrated version of the second entity, causing an error message identifying the second entity to be displayed to a user.

13. The non-transitory computer-readable storage medium of claim 12, wherein the error message identifying the second entity also comprises an identifier of the previously migrated version of the second entity.

14. The non-transitory computer-readable storage medium of claim 13, further comprising presenting a user interface to a user, the user interface configured to allow the user to view content of both the second entity and the previously migrated version of the second entity.

15. The non-transitory computer-readable storage medium of claim 14, wherein the user interface comprises an option to select the second entity and the operations include, responsive to the selection, the migration service replacing the previously migrated version of the second entity in the target instance software service with the second entity.

16. The non-transitory computer-readable storage medium of claim 12, wherein:

the migration service is further configured to form a data structure for the first entity, the data structure comprising an identifier of the second entity;
the data structure for the first entity is a first migration identifier;
determining that the previously migrated version of the second entity comprises determining that the second entity has a second migration identifier; and
the second migration identifier comprises a date of modification; and
the determination that the second entity has changed since the previous migration is based on the date of modification of its migration identifier.

17. The non-transitory computer-readable storage medium of claim 12, wherein:
the migration service is further configured to form a data structure for the first entity, the data structure comprising an identifier of the second entity and an identifier of a third entity; and
the operations further include:
determining that the third entity has been previously migrated such that the target instance software service has a target third entity as a result of the previous migration; and
responsive to the determination, the migration service creating a target first entity in the target instance software service and associating the target first entity with the target third entity.

18. The non-transitory computer-readable storage medium of claim 12, wherein the operations further include, migrating the second entity to the target instance software service.

19. A computer implemented method comprising:
determining, for a first entity of a set of migration entities to be migrated from a first instance of a project management system to a second instance of the project management system, a first set of associated entities including a second entity;
adding the second entity to the set of migration entities;
determining, for the second entity, a second set of associated entities including a third entity;
adding the third entity to the set of migration entities;
analysing the set of migration entities to identify entities, in the set of migration entities, that have been previously migrated to the second instance of the project management system;
in accordance with a determination that an identified entity has been previously migrated to the second instance of the project management system:
determine whether the identified entity is different from a version of the identified entity that was previously migrated; and
in accordance with a determination that the identified entity is different from the version of the entity that was previously migrated, cause an error message indicating the identified entity to be displayed to a user.

20. The computer implemented method of claim 19, wherein the first instance of the project management system is stored on a server computer system, and the second instance of the project management system is stored on a cloud computing system.

* * * * *